(12) United States Patent
Shahid

(10) Patent No.: US 6,525,146 B1
(45) Date of Patent: Feb. 25, 2003

(54) INHIBITION OF POPCORN POLYMER GROWTH

(75) Inventor: Muslim D. Shahid, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/541,420

(22) Filed: Apr. 3, 2000

(51) Int. Cl.[7] .................................................. C08F 2/40
(52) U.S. Cl. ........................................ 526/82; 526/335
(58) Field of Search .................... 526/82, 335

(56) References Cited

U.S. PATENT DOCUMENTS

| | | | |
|---|---|---|---|
| 2,320,859 A | | 6/1943 | Foord |
| 2,402,113 A | | 6/1946 | Hatch |
| 2,965,685 A | | 12/1960 | Campbell |
| 3,148,225 A | | 9/1964 | Albert |
| 3,417,154 A | | 12/1968 | Albert et al. |
| 3,426,063 A | | 2/1969 | Gros |
| 3,520,943 A | | 7/1970 | Albert |
| 3,524,894 A | | 8/1970 | Albert |
| 3,526,673 A | | 9/1970 | Albert |
| 4,409,408 A | * | 10/1983 | Miller et al. ............. 585/4 |
| 4,434,307 A | * | 2/1984 | Miller et al. ............. 585/4 |
| 4,456,526 A | | 6/1984 | Miller et al. |
| 4,468,343 A | | 8/1984 | Butler et al. |
| 4,628,132 A | | 12/1986 | Miller |
| 4,956,020 A | | 9/1990 | Nakajima |
| 5,345,030 A | * | 9/1994 | Sun et al. ............... 585/2 |
| 5,446,220 A | | 8/1995 | Arhancet |
| 5,773,674 A | | 6/1998 | Arhancet et al. |
| 5,792,821 A | * | 8/1998 | Bowen .................. 526/238.2 |
| 5,844,025 A | * | 12/1998 | Cunkle et al. ........... 524/99 |
| 5,880,230 A | * | 3/1999 | Syrinek et al. .......... 526/83 |

FOREIGN PATENT DOCUMENTS

| | | |
|---|---|---|
| EP | 0 240 297 A1 | 10/1987 |
| EP | 0 594 341 A1 | 4/1994 |
| EP | 0 664 279 A1 | 7/1995 |

OTHER PUBLICATIONS

PCT International Search Report Sep. 20, 2001 for International Application No. PCT/US01/13969.

Y. H. Li, et al., "Laboratory Tests and Field Implementation of Gas–Drag–Reduction Chemicals," SPE Production & Facilities, Feb. 1998, pp. 53–58.

* cited by examiner

Primary Examiner—David W. Wu
Assistant Examiner—William K. Cheung
(74) Attorney, Agent, or Firm—Madan, Mossman & Sriram, P.C.

(57) ABSTRACT

It has been discovered that the polymerization of diene compounds, such as butadiene, may be inhibited by the addition of a composition that contains at least one hindered or unhindered phenol, in combination with low nitrogen content component which is a stable nitroxide and/or a hydroxylamine substituted with at least one alkyl, aryl or alkylaryl group; and/or a second, different hindered or unhindered phenol, and optionally a hydrogen transfer agent.

9 Claims, 4 Drawing Sheets

*Comparison of Popcorn Polymer Inhibitors*

INHIBITION OF POPCORN POLYMER GROWTH

FIELD OF THE INVENTION

The present invention relates to methods and compositions for inhibiting polymerization of diene monomers, and more particularly relates, in one embodiment, to methods and compositions for inhibiting the polymerization of butadiene which gives rise to popcorn polymer growth.

BACKGROUND OF THE INVENTION

In the production of an olefin, such as a diene, the so-called popcorn polymer having a porous, three-dimensional structure occurs frequently and undesirably in process apparatus due to the unintentional polymerization of the olefin in refining, distillation and recovery or during recovery of the monomer after termination of intentional polymerization, such as during the production of synthetic rubber, in particular styrene-butadiene rubber. Popcorn polymer occurs both in the gaseous phase and the liquid phase. It is more likely to occur when the concentration of the olefin monomer is high and the temperature is high. A minute amount of oxygen, such as may come from a peroxide, may act as an initiator for the polymerization reaction. Iron rust, if present, accelerates the reaction of popcorn polymerization to a great extent.

Numerous olefin monomers such as styrene, α-methyl styrene, acrylic acid and esters thereof, vinyl acetate, acrylonitrile, acrylamide, methacrylamide, etc. and such dienes (diolefins) as 1,3-butadiene, isoprene, and chloroprene, upon reaching refining devices during production and recovery, are exposed to certain conditions such as high temperature, high monomer concentration, coexistence of vapor and liquid phase, humidity, trace oxygen and iron rust which are highly conducive to the occurrence of popcorn polymerization. Fouling of equipment can even occur when unsaturated compounds in petroleum or its derivatives undesirably polymerize.

The popcorn polymer is disposed to forming "seeds" which may continue to propagate until the monomer ceases to exist. Because of this phenomenon, minute particles of the popcorn polymer rapidly grow into large lumps of polymer. The popcorn polymer therefor adheres to and defiles the heat-exchanger, distillation tower, and piping installed within the system for refining and recovering the produced olefin and deteriorates the efficiency of the refining operation. It often clogs the apparatus and piping. In an extreme case, the mechanical pressure generated during the propagation of the polymer may deform and fracture the apparatus.

The reason for the rapid propagation of the popcorn polymer is that, as the polymer forms, radically active sites are newly formed inside the polymer and the polymer attains growth from the newly formed radically active sites. These radically active sites have a surprisingly long life. When the polymer is exposed to the ambient air during suspension of the operation of the apparatus, and brought into contact with the monomer as a result of the resumption of operation, it again starts growing and propagating from the active sites present.

The popcorn polymer is of such a quality that it is insoluble in all solvents and defies removal by heating. For the removal of the intractable popcorn polymer, the apparatus must be disassembled and mechanically cleaned. Temporary suspension of use of the apparatus and the cleaning thereof bring about an immense economic loss.

Numerous inhibitors have been proposed for the purpose of inhibiting popcorn polymerization. Examples include, but are not necessarily limited to, nitrates, nitrogen oxides, nitroso compounds, alkyl phenols, aromatic amines, hydroxylamines, etc. For these inhibitors to be effectively used, they must be continuously injected into the apparatus during its operation.

The compounds called alkyl-substituted di-nitro-phenols and nitroso-phenols found widespread use in the styrene industry. However, because such compounds also functioned as insecticides or were dangerous to handle, their use has been discouraged by environmental and government agencies.

Recently, a new class of compounds called stable free radicals is being investigated to replace the nitrophenol products. Although stable free radicals are effective against monomer polymerization, their current cost makes them unattractive. It would be desirable if a composition and method could be devised to overcome some of the problems in using the stable free radical polymerization inhibitors.

It will also be appreciated that not all polymerization inhibitors are effective to inhibit the undesired polymerization of all olefins, particularly dienes. Thus, it cannot be assumed that a polymerization inhibitor useful for mono-olefins is effective to inhibit undesired polymerization of dienes. Nor can it be assumed that a compound or composition effective in inhibiting polymerization of one diene, is necessarily effective to inhibit polymerization of another diene. Chemistry is an empirical science and it is often difficult to predict in advance, without trying a particular experiment, whether a particular inhibitor or combination thereof will be successful or not. The subject invention herein is focused upon providing polymerization inhibitors for dienes, particularly 1,3-butadiene, also referred to simply as butadiene. Popcorn polymerization problems with butadiene will be described in more detail.

In the manufacturing of synthetic rubber, the primary choice of feedstock is butadiene. Butadiene (BD) is a colorless gas at room temperature. Most of the supply of butadiene comes from olefin plants because butadiene is co-produced when other olefins are manufactured. Butadiene can be produced by catalytically dehydrogenating butane or butylene.

The dehydrogenation of butane or butylene to butadiene may be accomplished by passing the feed gas over a catalyst bed at 1200° F. (649° C.) and at reduced pressure. The effluent gas then passes through an extractive distillation process.

Although butadiene can be manufactured by catalytic dehydrogenation, most of the butadiene produced domestically is obtained by extractive distillation. Butadiene can be recovered and purified from $C_4$ streams by using a solvent that reduces the boiling point of the butadiene. The most popular solvents used to facilitate this extraction are N-methylpyrrolidone (NMP) and dimethyl-formamide (DMF).

The crude butadiene is further purified by distillation through a series of towers that separate residual solvent, $C_4$ compounds, and other contaminants. A further component of the BD manufacturing process is the Recovery Solvent Section. From the stripper column a slip stream of lean solvent is regenerated to remove heavies and contaminants. This reduces the presence of polymer loading and decomposition products.

During the purification steps of BD production, there are some undesirable BD polymerization reactions. Of these, the most unwanted is the formation of popcorn polymer. The effect of popcorn polymer on BD processing equipment is so severe that this material has actually been found to bend heat exchanger tubes.

Butadiene popcorn polymer is an insoluble but easily swelled polymer which varies in consistency. It has the unique property of generating more of the same type material in the presence of butadiene or another monomer.

As discussed previously, research investigations have shown that popcorn polymers grow by way of active free radical centers. These active centers are generated by the rupture of carbon-carbon bonds by strains resulting from swelling and growth. Although such phenomena have been observed both in BD plants and some research laboratories, there does not appear to be a standard test method that can be used to study butadiene popcorn polymer formation under laboratory controlled conditions.

The literature has suggested that some chemical additives have been found to be somewhat effective in controlling popcorn polymer formation. Chemical additives such as tert-butylcatechol (TBC), dinitro-tetraoxide, N,N-diethylhydroxylamine, hydroxybenzylphenylamines, and esters of organic sulfates are some of the additives that have been shown to negatively affect popcorn growth.

SUMMARY OF THE INVENTION

Accordingly, it is an object of the present invention to provide a method and composition to effectively inhibit the polymerization of diene compounds, in particular butadiene.

It is another object of the present invention to provide a method and composition to effectively inhibit the polymerization of dienes, such as butadiene, that is less expensive than using stable free radicals exclusively.

In carrying out these and other objects of the invention, there is provided, in one form, a composition for inhibiting polymerization of diene compounds which has at least two components. One component is a hindered or unhindered phenol which selected from the group of tert-butylcatechol (TBC); tert-butyl hydroquinone (TBHQ); 2,6-di-tert-butyl-4-methoxyphenol (DTBMP); 2,4di-tert-butylphenol; 2,5-di-tert-butylphenol; 2,6-di-tert-butylphenol; 2,4,6-tri-tert-butylphenol; butylated hydroxyltoluene (BHT); 2,6-di-tert-butyl-4-nonylphenol; 2,6-di-tert-butyl-4-sec-butylphenol; 2-butyl-4-methylphenol; 2-tert-butyl-4-methoxyphenol; butylated hydroxyanisole (BHA); 2,5-di-tert-butyl hydroquinone (DTBHQ); tert-amyl hydroquinone; 2,5-di-amyl hydroquinone; 3,5-di-tert-butylcatechol; hydroquinone; hydroquinone monomethyl ether; hydroquinone monoethyl ether; hydroquinone monobenzyl ether; or 3,3,3',3'-tetramethyl,1,1-spirobis-indane-5,5',6,6'-tetrol (Tetrol). The second component is selected from the group of low nitrogen content components which may be a stable nitroxide and/or a hydroxylamine substituted with at least one alkyl, aryl or alkylaryl group, and/or a second hindered or unhindered phenol selected from the above group of hindered or unhindered phenols.

DETAILED DESCRIPTION OF THE INVENTION

Figure 1:
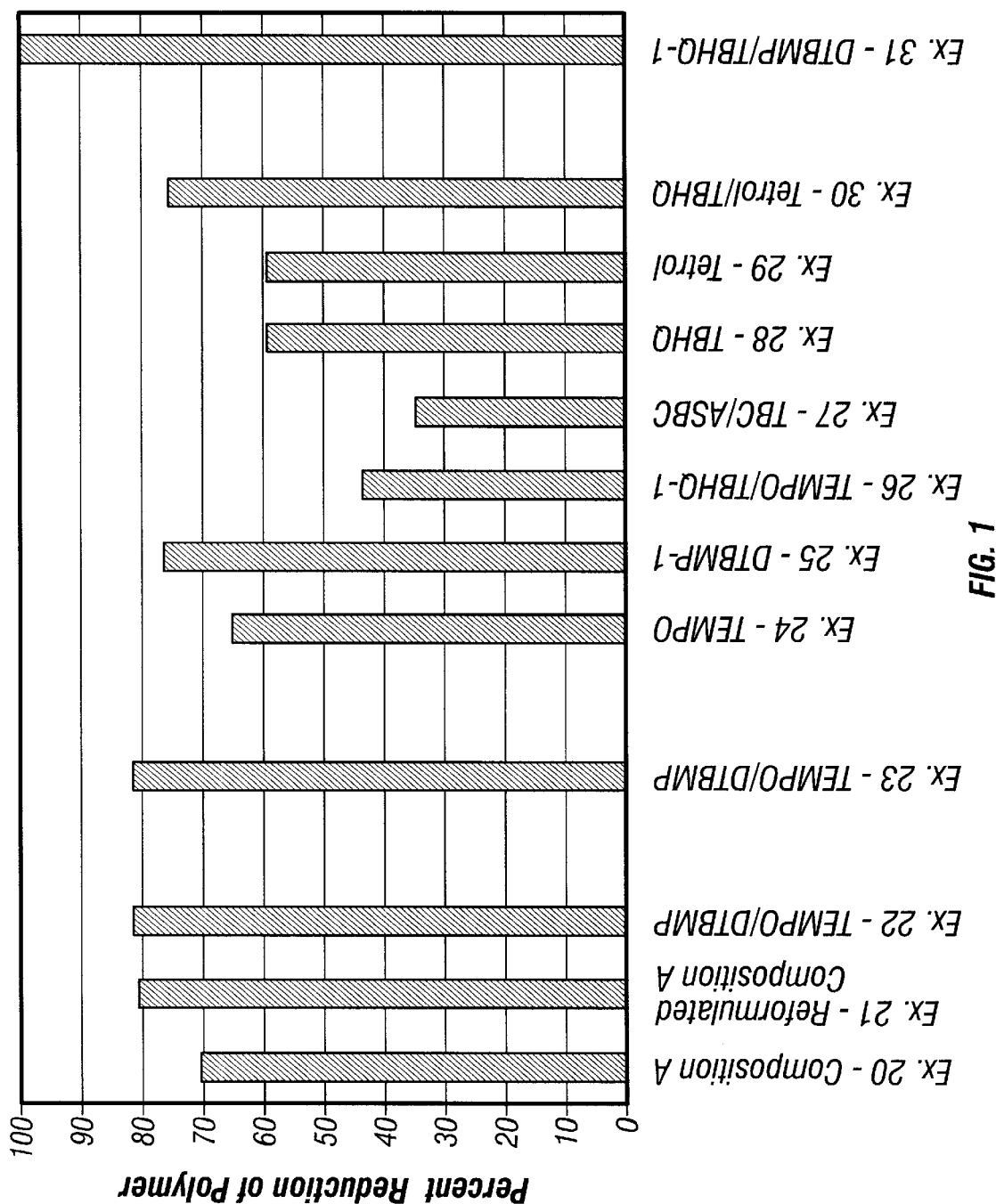
FIG. 1 is a graph showing the percent reduction of popcorn polymer using various inhibitor candidate compounds and combinations thereof.

It has been discovered that the combination of a hindered or unhindered phenol with a low nitrogen content component (stable nitroxide and/or a substituted hydroxylamine); and/or two different hindered or unhindered phenols, optionally including a hydrogen transfer agent, is an effective treatment to control diene monomer polymerization.

It is expected that suitable diene monomers that may be polymerization inhibited by the compositions and methods of this invention include, but are not necessarily limited to 1,3-butadiene, substituted butadiene, isoprene, chloroprene, and the like. Preferably, the diene monomer is 1,3-butadiene (BD).

Low Nitrogen Content Components

The low nitrogen content components may include stable nitroxides, as further described below, or other compounds which have one or few nitrogen atoms in their molecules. Compounds having only one nitrogen atom are preferred in some embodiments of the invention. Specific examples of such suitable hydroxylamines substituted with at least one alkyl, aryl or alkylaryl group include, but are not necessarily limited to N-ethylhydroxylamine (EHA); N,N'-diethylhydroxylamine (DEHA); N-ethyl-N-methylhydroxylamine (EMHA); N-isopropylhydroxylamine (IPHA); N,N'-dibutylhydroxylamine (DBHA); N-amylhydroxylamine (AHA); N-phenylhydroxylamine (PHA); and the like and mixtures thereof.

Stable Nitroxide

The stable nitroxide of the composition useful for inhibiting polymerization of diene compounds may include, but are not necessarily limited to those having the formula:

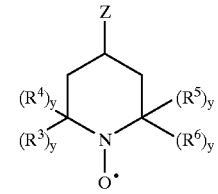

where $R^3$, $R^4$, $R^5$, and $R^6$ are the same or different and are independently selected from the group consisting of straight, branched, or cyclic alkyl groups of from 1 to about 9 carbon atoms, preferably from about 1 to 3 carbon atoms; where y averages from about 1 to about 6; where Z is selected from the group consisting of hydrogen, oxygen, alkyl groups, alkoxy groups, hydroxyl, aryl groups, alkaryl groups, heterocyclic alkyl groups; and where when Z contains carbon atoms, may contain an average of from about 1 to 9 carbon atoms, preferably from about 1 to 3 carbon atoms.

Examples of specific stable nitroxides that would be suitable in the composition of this invention falling within the above definition include, but are not necessarily limited to, 2,2,6,6-tetramethyl-1-piperidinyloxyl (TEMPO); 4-OXO TEMPO; 1-oxyl-2,2,6,6-tetramethylpiperidine; 1-oxyl-2,2,6,6-tetramethyl-piperidin-4-one; 1-oxyl-2,2,6,6-tetramethylpiperidin-4yl-2-acetate; 1-oxyl-2,2,6,6-tetramethyl-1-piperidin-4-yl-2-ethylhexanoate and mixtures thereof.

Unhindered or Hindered Phenols

Suitable hindered or unhindered phenols for the polymerization inhibiting composition of the invention may include, but are not necessarily limited to, tert-butylcatechol (TBC); tert-butyl hydroquinone (TBHQ); 2,6-di-tert-butyl4-methoxyphenol (DTBMP); 2,4di-tert-butylphenol; 2,5-di-tert-butylphenol; 2,6-di-tertbutylphenol; 2,4,6-tri-tert-butylphenol; butylated hydroxyltoluene (BHT, also known as 2,6-di-tert-butyl-paracresol and 2,6-di-tert-butyl-4-methyl-phenol); 2,6-di-tert-butyl4-nonylphenol; 2,6-di-tert-butyl4-sec-butylphenol; 2-butyl4-methylphenol; 2-tert-butyl-4-methoxyphenol; butylated hydroxyanisole (BHA); 2,5-di-tert-butyl hydroquinone (DTBHQ); tert-amyl hydroquinone; 2,5-di-amyl hydroquinone; 3,5-di-tert-butylcatechol; hydroquinone; hydroquinone monomethyl ether; hydroquinone monoethyl ether; hydroquinone monobenzyl ether; or 3,3,3',3'-tetramethyl, 1,1-spirobisindane-5,5',6,6'-tetrol (Tetrol), and mixtures thereof. Preferred hindered phenols include, but are not necessarily limited to, BHT, TBC, TBHQ and DTBMP.

When two hindered phenols are used in the composition, two preferred combinations include, but are not necessarily limited to, TBHQ with BHT and TBHQ and DTBMP.

Hydrogen Transfer Agent

It is anticipated that any compound which readily donates hydrogen would be expected to be useful as a hydrogen transfer agents. The use of hydrogen transfer agents in this invention is optional, but may be preferred, particularly in the case where the composition does not contain a stable nitroxide, but instead contains two different hindered or unhindered phenols. Hydrogen transfer agents suitable for use in the polymerization inhibiting composition of this invention include, but are not necessarily limited to, naphthalene; anthracene; decalin; hydroquinoline; 1,2,3,4-tetrahydronaphthalene (TETRALIN®; DuPont); 9,10-dihydroanthracene; fluorene ($\alpha$-diphenylenemethane); squalane (also known as perhydrosqualene; 2,6,10,15,19,23-hexamethyltetracosane; spinacane; and dodecahydrosqualane); squalene (spinacene); tetramethylhydroquinoline; and mixtures thereof.

Proportions

A number of factors affect the effective amounts of the hindered or unhindered phenols, hydrogen transfer agents, and stable nitroxides of this invention that would be useful to inhibit the polymerization of a diene compound, including, but not necessarily limited to, the nature of the diene compound, the concentration of the diene compound, the temperature and pressure environment of the diene compound, the nature of the particular hindered or unhindered phenols, hydrogen transfer agents, and stable nitroxides used, and the like. Nevertheless, some general guidelines as to the effective proportion of the hindered or unhindered phenols, stable nitroxides, and hydrogen transfer agents in the diene compound may be given.

The composition of this invention may have from about 1 to about 10,000 ppm of the hindered or unhindered phenol; from about 1 to about 10,000 ppm of the hydrogen transfer agent, if present; and from about 1 to about 10,000 ppm of the stable nitroxide, based on the total amount of diene compound being treated. Preferably, the proportions range from about 1 to about 5000 ppm of the hindered or unhindered phenol; from about 1 to about 400–500 ppm of the hydrogen transfer agent; and from about 1 to about 5000 ppm of the stable nitroxide, based on the total amount of diene compound being treated.

When considered as a composition or blend of components, outside of being applied to the diene compound, the first hindered or unhindered phenol ranges from about 1 to about 30 wt. % of the total composition, whereas the proportion of the second component (second hindered or unhindered phenol or low nitrogen content component) ranges from about 5 to about 45 wt. % of the total composition. Preferably, the composition contains from about 5 to about 10 wt. % of the first hindered or unhindered phenol, and from about 10 to about 20 wt. % of the second component. The balance of the composition may be any suitable insert solvent, including, but not necessarily limited to, dimethylformamide (DMF), N-methylpyrrolidone (NMP), and the like and mixtures thereof.

The components of the composition may be simply mixed together. They may be mixed together in a single composition prior to addition to the diene aromatic compound, although they may also be added to the diene compound separately.

The invention will be further illustrated with respect to specific examples, which are not intended to limit the invention, but rather to more fully describe it.

Popcorn Polymer Glass Tube Reaction Test Method

The Popcorn Polymer Glass Tube Reaction Method allows for the evaluation of many samples at once, and may be described as follows:

1. Obtain butadiene popcorn polymer "seeds" (in the Examples of this invention the seeds were obtained in 1996 from a BD holding tank). Activate popcorn polymer "seeds" overnight with a 150 watt flood lamp. The "seeds" are first placed in a petri dish and covered. Then they are exposed to white light from the lamp for approximately 20 hours. The lamp is positioned 12 inches (30.5 cm) above the dish.

2. To glass reaction vessels add 1 ml of deionized water. To the glass reaction vessel and water place approximately 0.6200 gms of BD popcorn "seed". Add inhibitor, if any, into the water and seal the reaction vessel with a TEFLON adapter. Completely seal off the adapter by use of a metal adapter plug. Using a gas-tight syringe, inject 15 mls of butadiene monomer into the reaction vessel by way of a septum port located at the top of the TEFLON adapter.

3. Next, place the reaction vessel containing BD popcorn "seed" and butadiene monomer into a block incubator bath which is capable of maintaining a constant temperature of 60° C. Allow the test to run for 14 to 28 days. Remove the reaction vessel from the incubator bath.

4. Vent the BD out of the vessel by slowly opening the metal adapter plug. Slowly open the reaction vessel and decant the water/BD mixture. Rinse the wet polymer with n-heptane until most of the n-heptane is essentially clear of haze. Blow dry nitrogen into the reaction vessel to further dry the polymer. Remove the popcorn polymer carefully with tweezers and spatula and place in a 100 ml beaker. Wash the popcorn polymer material three times with 30 ml aliquots of n-heptane.

5. Transfer the popcorn polymer sample into a petri dish. Place dish into a vacuum oven. Dry sample at 212° F. (100° C.) under a 30 mmHg vacuum for 30 minutes. Remove dish and sample from oven. Place dish and popcorn polymer sample in a desiccator. Cool for 1 hour and record the weight of the popcorn polymer. The weight of new polymer growth can be obtained by subtracting the original seed weight from the total popcorn polymer weight.

Results

Table I reports the testing using the above test method with three controls (blanks), comparative Composition A, and one composition of the invention, Ex. 5, a blend of TEMPO and TBC. Composition A is 29% of 85% active TBC; 25% of 85% DEHA, and 46% DMF.

TABLE I

Polymerization Inhibition Using Various Components

| Ex. | Additive | Concentration (ppm) | Polymer formed, mg/15 ml | % Inhibition |
|---|---|---|---|---|
| 1 | none | — | 1,436 | N/a |
| 2 | none | — | 1,920 | N/a |
| 3 | none | — | 2,080 | N/a |
| 4 | Composition A | 250 | 700 | 61 |
| 5 | TEMPO<br>TBC | 125<br>570 | 570 | 69 |

TABLE II

Polymerization Inhibition Using Various Components
The data below summarizes the results of selected combinations of additives described in the instant invention.

| Ex. | Additive | Concentration (ppm) | Polymer formed mg/15 ml | % Inhibition |
|---|---|---|---|---|
| 6 | none | — | 1,100 | N/a |
| 7 | TEMPO | 250 | 550 | 50 |
| 8 | TBHQ | 250 | 770 | 30 |
| 9 | Composition A | 250 | 937 | 15 |
| 10 | TBHQ<br>DTBMP | 146<br>104 | 230 | 80 |
| 11 | TEMPO<br>TBHQ | 125<br>125 | 620 | 44 |

It may be seen that Examples 10 and 11 using a second component with TBHQ give better % inhibition than Example 8 using TBHQ alone.

TABLE III

Polymerization Inhibition Using Various Components
The data below summarizes the results of selected combinations of additives described in the instant invention.

| Ex. | Additive | Concentration (ppm) | Polymer formed mg/15 ml | % Inhibition |
|---|---|---|---|---|
| 12 | none | — | 476 | N/a |
| 13 | none | — | 468 | N/a |
| 14 | Reformulated Composition A | 250 | 20 | 96 |
| 15 | Original Composition A* | 250 | <20 | 96 |
| 16 | TEMPO<br>TBC | 125<br>125 | 30 | 94 |
| 17 | TEMPO<br>DTBMP | 125<br>125 | 83 | 83 |
| 18 | TEMPO | 250 | 80 | 83 |
| 19 | DTBMP | 250 | 108 | 77 |

*Final weight less than original weight. This is most likely due to an original weighing error or loss of a very small amount during the polymer washing stage. Still, visual observation clearly indicated that the original Composition A was no different than Reformulated Composition A which was identical to Composition A except that it contained no DMF solvent.

It is noted that Inventive Examples 16 and 17 gave better or at least as good results as did Comparative Example 18 using an equal amount of the more expensive TEMPO alone, and better results than Comparative Example 19 using an equal amount of DTBMP alone.

EXAMPLES 20–31

The results of Examples 20 through 31 are reported in FIG. 1. FIG. 1 shows the effect of selected inhibitors on BD popcorn polymer formation using the test method at 60° C. for 14 days. All doses were at 250 ppm total inhibitor. When more than one component was used, equal proportions of component adding to a total of 250 ppm were used. Examples marked with a "–1" indicate that the results are for only one test run. Results in all other Examples reported herein, unless otherwise noted, are the average of more than one test run. It may be seen that the compositions of this invention gave excellent polymer reduction as seen from the results of Examples 22, 23, 30 and 31 reported in FIG. 1.

EXAMPLES 32–37

Figure 2:
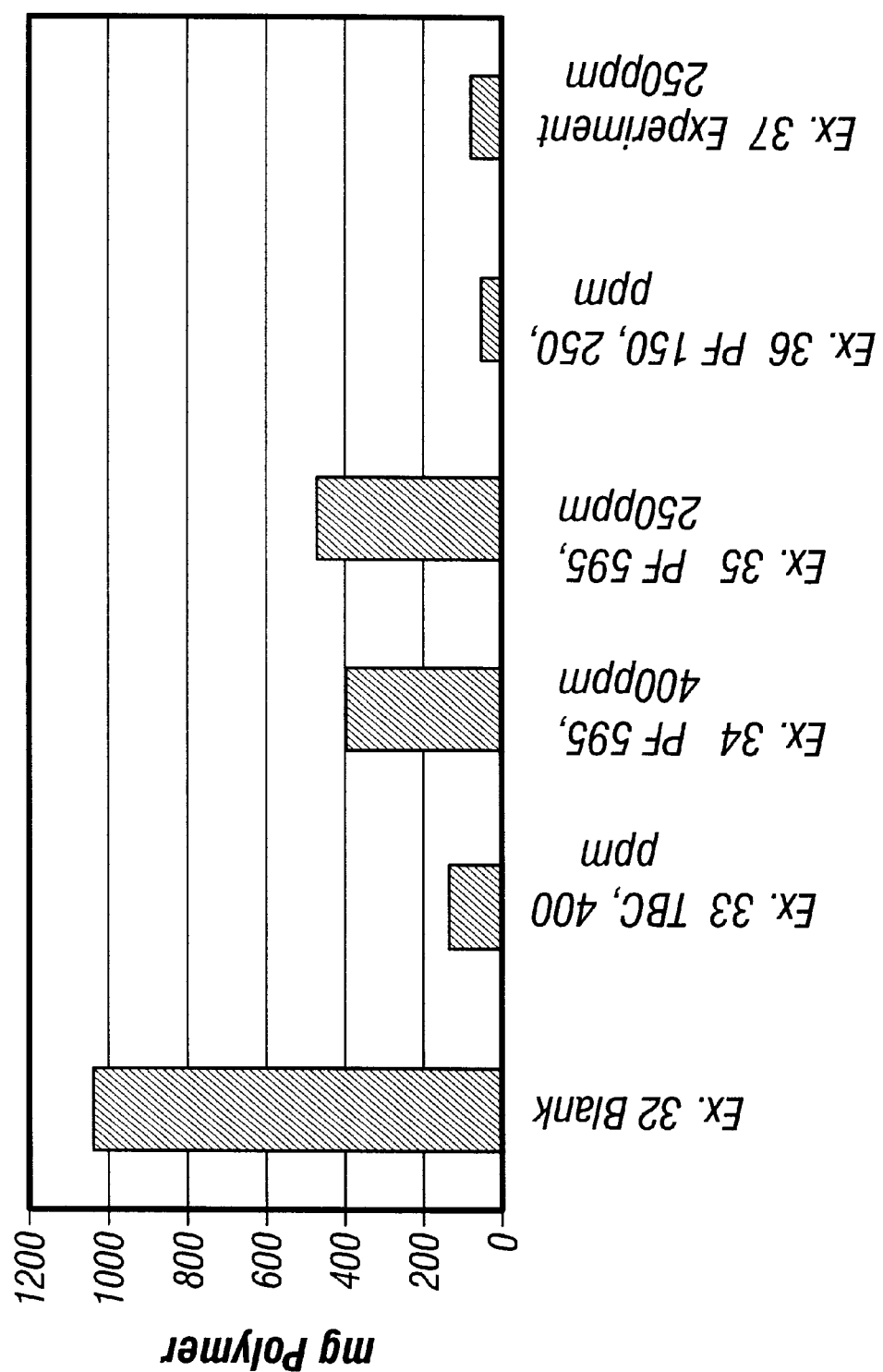
FIG. 2 is a graph showing popcorn polymer formation for various inhibitor candidate compounds and combinations thereof.

The butadiene popcorn polymer test method described above was run to compare the effectiveness of POLYFREE 150 (PF 150), POLYFREE 595 (PF 595), tert-butyl catechol (TBC), and an experimental, inventive blend of 125 ppm 2,6-di-tert-butyl-4-methoxyphenol (DTBMP) and 125 ppm 2,6-di-tert-butyl hydroquinone (DTBHQ) (Example 37). POLYFREE 150 and POLYFREE 595 are commercial polymerization inhibitors of Baker Petrolite Corporation. A graph of the results is shown in FIG. 2.

As can be seen, POLYFREE 595 is not as effective as TBC at equivalent dosages (compare Ex. 34 with Ex. 33). However, the POLYFREE 595 provides a 61% improvement over the blank. It may be seen that the inventive blend of Example 37 compared favorably with POLYFREE 150 at the same concentration in Example 36.

EXAMPLES 38–41

Figure 3:
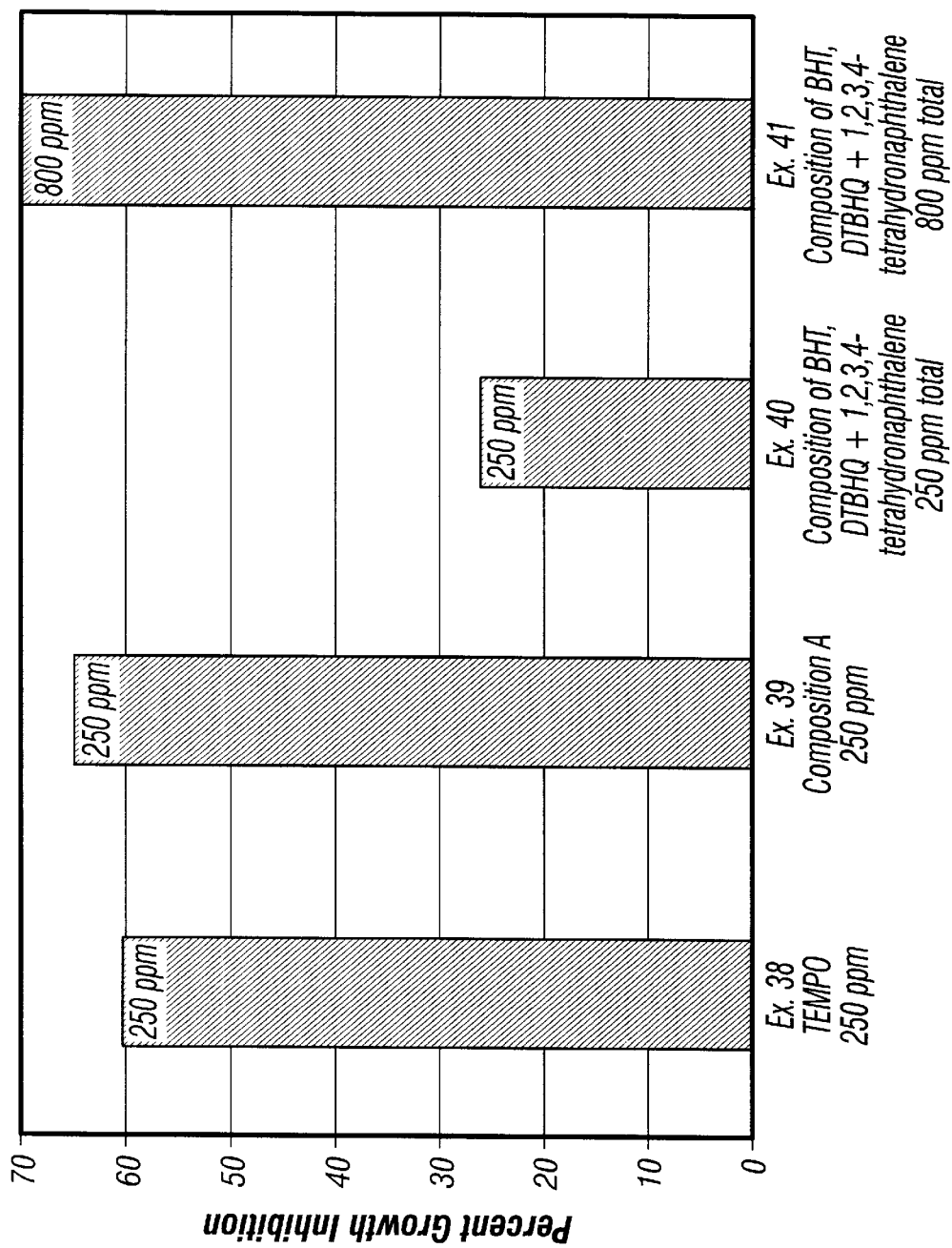
FIG. 3 is a graph showing the percent popcorn polymer growth inhibition using various inhibitor candidate compounds and combinations thereof.

The butadiene popcorn polymer test method described above was run to compare the effectiveness of TEMPO alone (Ex. 38), Composition A alone (Ex. 39), and an inventive blend of BHT, DTBHQ and the hydrogen transfer agent 1,2,3,4-tetrahydronaphthalene at two different concentrations (Examples 40 and 41). A graph of the results is shown in FIG. 3 where 800 ppm of the inventive blend gave the best results at 70% inhibition.

EXAMPLES 42–46

Figure 4:
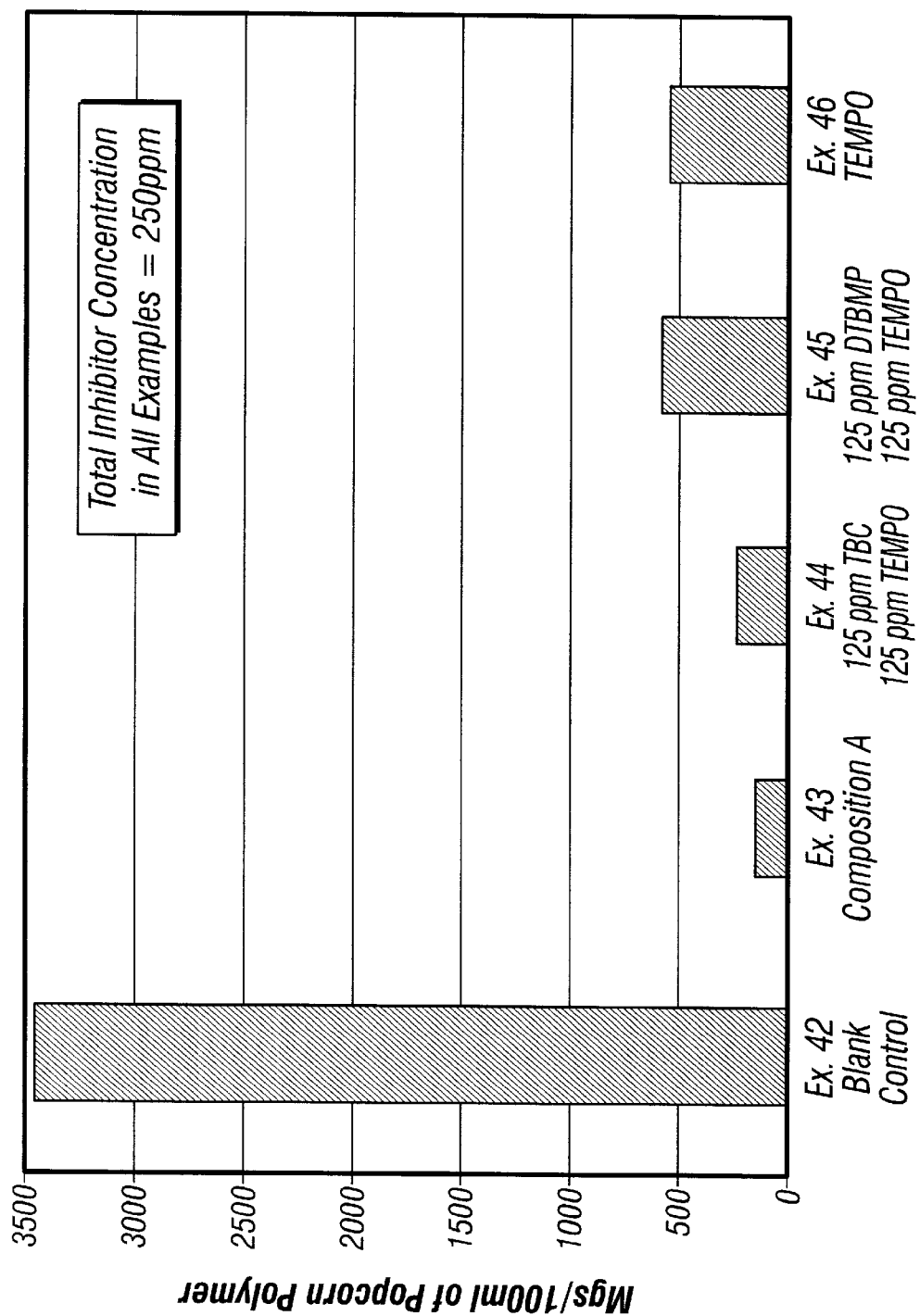
FIG. 4 is a graph showing popcorn polymer formation for various inhibitor candidate compounds and combinations thereof.

The butadiene popcorn polymer test method described above was run to compare the effectiveness of Composition A alone (Ex. 43), an inventive blend of TBC and TEMPO (Ex. 44), an inventive blend of DTBMP and TEMPO (Ex. 45), and TEMPO alone (Ex. 46), each at a total concentration of 250 ppm. A graph of the results is shown in FIG. 4 where the inventive blend of Example 44 gave comparative results to Composition A in Example 43, and the inventive blend of Example 45 gave comparative results to TEMPO alone used in Example 46.

In the foregoing specification, the invention has been described with reference to specific embodiments thereof, and has been demonstrated as effective in providing a composition for inhibition of polymerization of diene compounds, such as butadiene. However, it will be evident that various modifications and changes can be made thereto without departing from the broader spirit or scope of the invention as set forth in the appended claims. Accordingly, the specification is to be regarded in an illustrative rather than in a restrictive sense. For example, specific combinations of components, other than those specifically tried, in other proportions or ratios or added in different ways, falling within the claimed parameters, but not specifically identified or tried in a particular composition to improve the polymerization inhibition herein, are anticipated to be within the scope of this invention.

I claim:

1. A polymerization inhibited diene compound composition comprising:
   a) a diene compound;
   b) a first hindered or unhindered phenol selected from the group consisting of:
   tert-butylcatechol (TBC);
   tert-butyl hydroquinone (TBHQ);
   2,6-di-tert-butyl-4-methoxyphenol (DTBMP);
   2,4-di-tert-butylphenol;
   2,5-di-tert-butylphenol;
   2,6-di-tert-butylphenol;
   2,4,6-tri-tert-butylphenol;
   butylated hydroxyltoluene (BHT);
   2,6-di-tert-butyl4-nonylphenol;
   2,6-di-tert-butyl4-sec-butylphenol;
   2-butyl-4-methylphenol;
   2-tert-butyl-4-methoxyphenol;
   butylated hydroxyanisole (BHA);
   2,5-di-tert-butyl hydroquinone (DTBHQ);
   tert-amyl hydroquinone;
   2,5-di-amyl hydroquinone;
   3,5-di-tert-butylcatechol;
   hydroquinone;
   hydroquinone monomethyl ether;
   hydroquinone monoethyl ether;
   hydroquinone monobenzyl ether; and
   3,3,3'1,3'-tetramethyl,1,1 -spirobis-indane-5,5',6,6'-tetrol (Tetrol);
   c) at least one additional component selected from the group consisting of
   low nitrogen content components selected from the group consisting of a stable nitroxide having the formula:

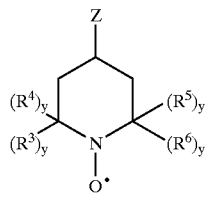

where $R^3$, $R^4$, $R^5$, and $R^6$ are the same or different and are independently selected from the group consisting of straight, branched, or cyclic alkyl groups of from 1 to about 9 carbon atoms; where y averages from about 1 to about 6;
   where Z is selected from the group consisting of hydrogen, oxygen, alkyl groups, alkoxy groups, hydroxyl, aryl groups, alkaryl groups, and when Z contains carbon atoms, contains an average of from about 1 to 9 carbon atoms, and
   a hydroxylamine substituted with at least one alkyl, aryl or alkylaryl group; and
   a second hindered or unhindered phenol selected from the group b).

2. The composition of claim 1 where the c) additional component is the stable nitroxide 2,2,6,6,-tetramethyl-1-piperidinyloxyl (TEMPO).

3. The composition of claim 1 where the c) additional component is a substituted hydroxylamines with selected from the group consisting of:
   N-ethylhydroxylamine (EHA);
   N,N'-diethylhydroxylamine (DEHA);
   N-ethyl-N-methylhydroxylamine (EMHA);
   N-isopropylhydroxylamine (IPHA);
   N,N'-dibutylhydroxylamine (DBHA);
   N-amylhydroxylamine (AHA);
   N-phenylhydroxylamine (PHA);
   and the like and mixtures thereof.

4. The composition of claim 1 where the c) additional component is a second hindered or unhindered phenol selected from the group b).

5. The composition of claim 4 further comprising optionally a hydrogen transfer agent selected from the group consisting of:
   1,2,3,4-tetrahydronaphthalene,
   9,10-dihydroanthracene,
   fluorene (α-diphenylenemethane),
   squalane,
   squalene, and
   tetramethylhydroquinone.

6. The composition of claim 4 where the composition comprises two hindered phenols selected from the combinations of the group consisting of:
   DTBHQ and BHT; and
   DTBHQ and DTBMP.

7. The composition of claim 1 where the proportion of the first hindered or unhindered phenol ranges from about 30 wt. % of the composition and the proportion of the second component ranges from about 5 to about 45 wt. % of the composition.

8. The composition of claim 1 where the diene is butadiene.

9. The composition of claim 1 where the first hindered or unhindered phenol is present in an amount ranging from about 1 to about 10,000 ppm based on the composition, and the second component ranges from about 1 to about 10,000 ppm based on the total amount of diene.

* * * * *